March 10, 1925.

O. O. ANDERSON

STOCK WATERER

Filed June 16, 1924

1,529,152

O. O. Anderson Inventor

By C. A. Snow & Co.

Attorneys

Patented Mar. 10, 1925.

1,529,152

UNITED STATES PATENT OFFICE.

OSCAR O. ANDERSON, OF SIOUX RAPIDS, IOWA.

STOCK WATERER.

Application filed June 16, 1924. Serial No. 720,329.

*To all whom it may concern:*

Be it known that I, OSCAR O. ANDERSON, a citizen of the United States, residing at Sioux Rapids, in the county of Buena Vista and State of Iowa, have invented a new and useful Stock Waterer, of which the following is a specification.

This invention relates to a stock waterer and it is designed more especially as an improvement upon the structure disclosed in my co-pending application, Serial No. 642,057.

One of the objects of the invention is to provide simple and efficient means whereby the pipe leading from the water supply tank to the watering trough can be kept warm and thus prevent freezing during cold weather.

Another object is to provide a simple form of heating apparatus which can be easily installed, will not readily get out of order, and requires the minimum space.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1:
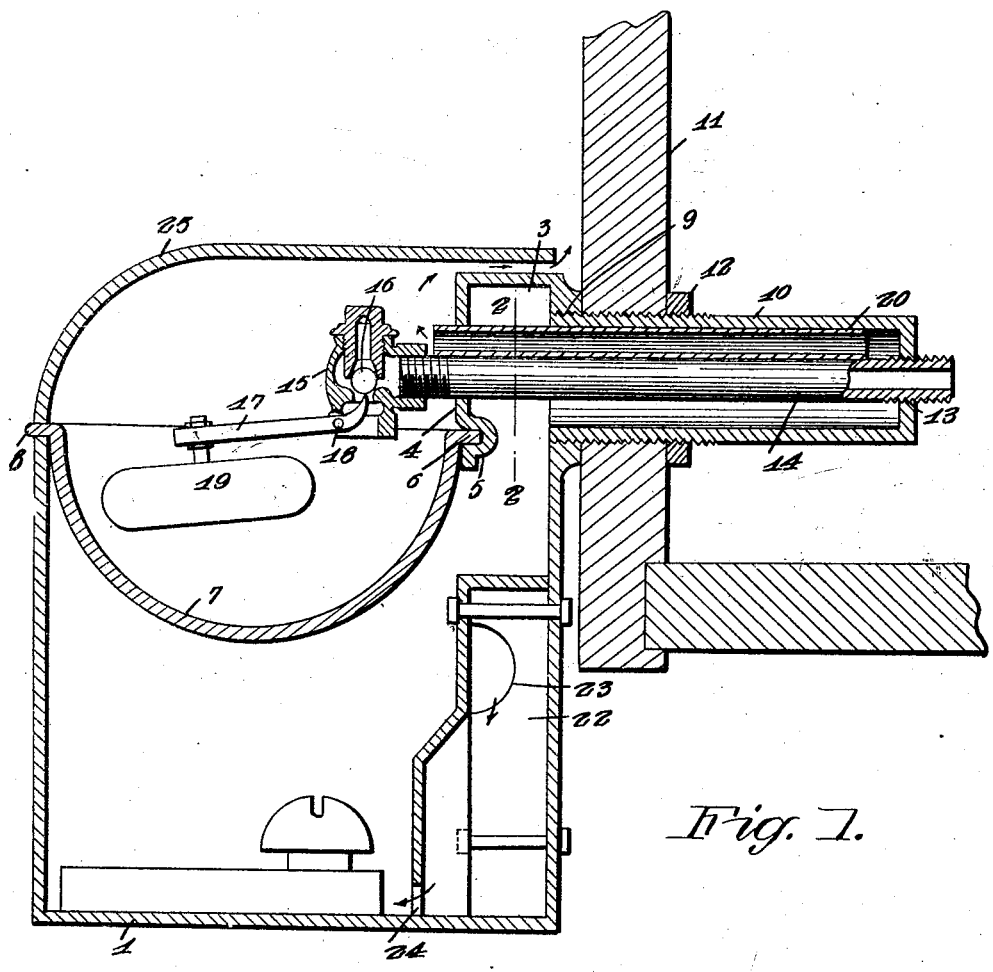
Figure 1 is a vertical section through a feed trough and a portion of the supply tank having the present improvements combined therewith.
Figure 2:
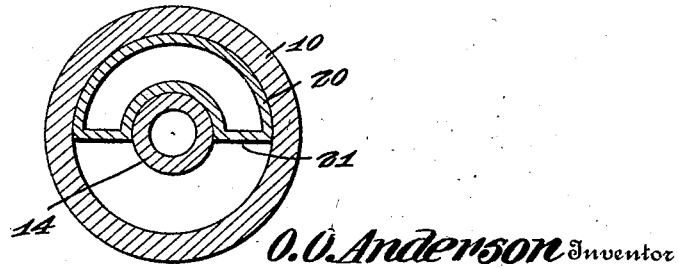
Fig. 2 is an enlarged section on line 2—2, Fig. 1.

Referring to the figures by characters of reference 1 designates a housing adapted to hold a heating lamp 2. This housing has an upwardly extending portion 3, the front wall 4 of which has a depression 5 for the reception of a flange 6 extending backwardly from a watering trough 7. This watering trough is adapted to close the top of the housing 1 and has a forwardly extending flange 8 which rests on the front wall of the housing. The rear wall of housing 1 is provided near its upper end with a threaded opening 9 in which is seated the threaded forward end of a tubular housing 10. This tubular housing is extended through the wall of a supply trough 11 and is held to the wall by means of a nut 12 in threaded engagement with the housing 10. An opening 13 is provided in that end of housing 10 within tank 11 and receives the threaded end of the feed pipe 14. This feed pipe is extended longitudinally of the housing 1 and thence through the front wall 4 of said portion as shown clearly in Fig. 1. A valve casing 15 engages this projecting end of the pipe 14 and contains a ball valve 16 which normally closes the outlet of the casing. A lever 17 is fulcrumed in the casing at 18 and carries a float 19 normally supported within the trough 7. When this float moves downwardly past a predetermined level, the inner end of lever 17 will force upwardly against ball 16 and unseat it. When the float is lifted by water in the trough 7, however, the ball 16 can gravitate to its seat.

Mounted on the pipe 14 and within the housing 10 is a flue member 20 which straddles and rests on the pipe 14 and has its bottom wall 21 extended to the wall of housing 10 so as thus to form a partition. The arcuate wall of the flue member 20 fits against the housing 10. This flue member is open at both ends. One of its ends is spaced from the closed end wall of the housing 10 while the other end opens through the front wall 4 of the upwardly extended portion 3.

An air supply box 22 can be secured within the housing 1, this box being provided with an air inlet 23 and an air outlet 24, the inlet being in communication with the outer atmosphere.

In using the device water will of course flow through pipe 14 to trough 7 until float 19 is elevated a sufficient distance to allow the valve 16 to rest upon its seat. During the winter months it has been a difficult matter to prevent the feed pipe from freezing. The present invention is designed to overcome this objection. When the lamp 7 is lighted, the air admitted thereto through openings 23 and 24 will be heated and flow upwardly into extension 3 and thence along housing 10 to the remote end of flue 20. The heated air will then flow along this flue until it escapes close to and above the valve 15. The course of the heated air has been indicated by arrows. Some of the air that is thus heated will come against the bottom of the trough 7 and prevent water from freezing therein.

Obviously by utilizing the arrangement described the pipe 14 as well as the trough 7 will not freeze and the trough can thus be used in all kinds of weather.

The plate indicated at 25 constitutes nothing more than a shield extending over the middle portion of the trough where the lever 17 is located, thus to prevent the live stock from disturbing the lever and float.

What is claimed is:—

1. The combination with a supply tank, a watering trough and a heater housing having a closed extension communicating therewith, of a feed pipe opening into the tank for delivering water to the trough, a tubular housing through which the feed pipe extends, a return flue straddling the feed pipe and mounted within a portion of the housing, said return flue opening into one end of the feed pipe housing and at its other end opening above the trough, said feed pipe housing having one end in communication with the extension of the heater housing.

2. The combination with a supply tank, a watering trough, and a heater housing under the trough provided with an extension communicating with said housing, of a tubular housing communicating at one end with the extension and projecting into the tank, a feed pipe extending through the tubular housing and opening at one end into the tank and at its other end above the trough, and a return flue extending longitudinally of the tubular housing for conducting hot gases from one end of the tubular housing and through the extension to a point above the trough.

3. The combination with a supply tank, a watering trough, and a heater housing having a closed extension opening into said housing, of a tubular housing projecting into the tank and communicating with the extension, a feed pipe extending longitudinally through the tubular housing and opening at one end into the tank and at its other end into the trough, and means within the tubular housing for setting up a back and forth circulation along the feed pipe of hot gases flowing from the heater housing into the tubular housing.

4. The combination with a supply tank, a watering trough, and a heater housing having a closed extension opening into said housing, of a tubular housing projecting into the tank and communicating with the extension, a feed pipe extending longitudinally through the tubular housing and opening at one end into the tank and at its other end into the trough, and means within the tubular housing for setting up a back and forth circulation along the feed pipe of hot gases flowing from the heater housing into the tubular housing, said means including a return flue insertable into the tubular housing and adapted to bear upon and straddle the feed pipe, said return flue being open at one end in one end portion of the tubular housing and at its other end above the trough.

In testimony that I claim the foregoing as my own, I have hereto affixed by signature in the presence of two witnesses.

OSCAR O. ANDERSON.

Witnesses:
N. C. SIMONSEN,
WILFORD HANSON.